United States Patent [19]

Erisman

[11] Patent Number: 5,402,060
[45] Date of Patent: Mar. 28, 1995

[54] CONTROLLER FOR TWO-SWITCH BUCK-BOOST CONVERTER

[75] Inventor: Brian P. Erisman, Colorado Springs, Colo.

[73] Assignee: Toko America, Inc., Mount Prospect, Ill.

[21] Appl. No.: 62,309

[22] Filed: May 13, 1993

[51] Int. Cl.$^6$ ............................................. G05F 1/40
[52] U.S. Cl. ................................. 323/268; 323/344; 323/351; 363/101
[58] Field of Search ............... 323/259, 344, 345, 222, 323/271, 268, 282–284, 351; 363/101

[56] References Cited

U.S. PATENT DOCUMENTS

| 4,161,771 | 7/1979 | Bates | 363/43 |
| 4,549,254 | 10/1985 | Kissel | 363/21 |
| 4,639,844 | 1/1987 | Gallios et al. | 363/17 |
| 4,685,040 | 8/1987 | Steigerwald et al. | 363/17 |
| 4,686,617 | 8/1987 | Colton | 363/56 |
| 4,864,213 | 9/1989 | Kido | 323/222 |
| 5,289,361 | 2/1994 | Vinciarelli | 363/80 |

Primary Examiner—Steven L. Stephan
Assistant Examiner—Adolf Berhane
Attorney, Agent, or Firm—William E. Hein

[57] ABSTRACT

A controller for a two-switch buck-boost converter accomplishes one-at-a-time switch control by simultaneously employing an analog error signal to control one drive output and an analog inversion of that error signal, with respect to a voltage that is equal to the voltage excursion limit of a timing ramp signal, to control the other drive output. In a second embodiment of the invention, a controller employs a comparator to compare an analog error signal against a given voltage excursion limit of a timing ramp signal to perform the functions of determining which of two drive outputs is to be enabled to be modulated and of modifying the voltage excursion limits of the timing ramp signal such that the voltage excursion limit compared by the comparator is switched between two different voltage excursion limits.

8 Claims, 4 Drawing Sheets 5,402,060

CONTROLLER FOR TWO-SWITCH BUCK-BOOST CONVERTER

BACKGROUND AND SUMMARY OF THE INVENTION

This invention relates generally to DC to DC converters and more particularly to a two-switch buck-boost converter. A two-switch buck-boost converter defines a well known electrical topology used for non-isolated DC to DC power conversion in which the DC input voltage may either be "bucked" down or "boosted" up as required to produce the desired DC output voltage. A typical prior art two-switch buck-boost converter is illustrated in FIG. 1. The primary objective of this circuit, as in all power conversion topologies, is to convert the power from input to output with a minimum loss of power within the converter. This is to say that high power transfer efficiency is desired. While the most straightforward technique for controlling a buck-boost converter is by simultaneous switching of both of its switches, this control technique suffers from an unnecessary degradation in power transfer efficiency. Theoretically, it is only necessary to regulate the converter by actively switching only one of its switches at a time, depending on whether the output voltage is to be lowered or raised with respect to the input voltage of tile converter. As the process of switching a switch from one state to another causes a loss of power, this latter technique is more desirable.

In operation, the prior art buck-boost converter of FIG. 1 involves applying a uni-polar input voltage across terminals Q and R, with the polarity being positive and negative, respectively. The output voltage is developed across terminals S and T, with the polarity being positive and negative, respectively. Terminals R and T are electrically connected and described as being at zero reference potential or ground. Terminals E and F, respectively, represent the control inputs to a pair of semiconductor devices S1 and S2, known in this converter as the boost switch and buck switch, respectively. Semiconductor devices S1 and S2 may be MOSFET devices, as illustrated. If devices S1 and S2 are modulated simultaneously, it is possible to achieve any positive output voltage, within the limitations of the circuit components employed. This conventional simultaneous switching of devices S1 and S2 results in unnecessary power losses.

If device S1 is modulated while device S2 remains OFF, the output voltage can be regulated to any positive potential up to the input voltage minus voltage losses in the circuit. This is known as the buck mode of operation of the converter. If device S2 is modulated while device S1 remains ON, the output voltage can be regulated to any positive potential not less than the input voltage minus voltage losses in the circuit. This is known as the boost mode of operation of the converter. The latter two modes of operation of the prior art converter of FIG. 1 describe one-at-a-time switch control that results in a higher power conversion efficiency than does simultaneous switch modulation.

Recently, Fuji-Denki, Inc. of Japan introduced a buck-boost controller integrated circuit (Part No. FA7618) in which the one-at-a-time switch control method is successfully implemented. The relevant portion of the circuitry of this buck-boost controller is shown in FIG. 2A. One feature inherent in the buck-boost topology was foremost in allowing successful implementation of one-at-a-time switch control: that is, for a given input voltage, the output voltage of the converter is the same in buck mode running at a 100% duty ratio as is in the boost mode running at 0% duty ratio. The term duty ratio is well understood in the art to be the ratio of the ON time of a switch to the time required to complete a full cycle of ON and OFF times. Therefore, the challenge in developing this prior art control circuit was the requirement that as the signal which controls the duty ratio of the buck switch approaches 100%, the same signal must also be on the verge of modulating the boost switch starting from 0% duty ratio.

A conventional technique for accomplishing fixed-frequency pulse-width modulated control fo the switch drive duty ratio is to use a comparator to compare the control signal (error signal) against a timing ramp represented by a triangular or sawtooth waveform of fixed magnitude and frequency. The implementation employed in the prior art FA7618 controller was to use one comparator in the standard fashion just described to control one drive signal and to shift the level of one input of another comparator an amount equal to the magnitude of the timing ramp to control the other drive signal. Properly oriented, this results in the desired drive signals for both switches of the buck-boost converter. By setting the magnitude of the level shift just described equal to the ramp magnitude, the transition between the buck and boost modes can be accomplished without requiring a change in the operating point, during which time the output would be disturbed.

Operation of the prior art FA7618 controller may be understood with reference to the circuit diagram of FIG. 2A and the waveform diagram of FIG. 2B. A triangle wave oscillator ramps at a constant frequency between two potentials applied to terminals B and C to provide a timing ramp that is available at terminal G. An error signal is applied at terminal A. A comparator having an output terminal F compares the oscillator potential against the error signal potential. Its input polarities are configured such that when the error signal potential exceeds the oscillator potential the output is high, and conversely. Terminal F serves as the control terminal for the buck switch S1 of FIG. 1. Another comparator having an output terminal E compares the oscillator potential against a potential equal to the error signal potential decreased by an amount $V_{LS}$. $V_{LS}$ is ideally equal in magnitude to the difference in the potential across terminals B and C, which is equal to the voltage excursion magnitude of the oscillator. Terminal E serves as the control terminal for the boost switch S2 of FIG. 1. A disadvantage in the design of the prior art FA7618 controller is the implementation of the level shift circuit. The key to optimal transition between buck and boost modes without overlapping lies in precisely tracking the level shift magnitude with the timing ramp magnitude. Therefore, control of the level shift and the timing ramp magnitudes are critical, the former being the more difficult to control precisely.

It is therefore an object of the present invention to provide a controller for a two-switch buck-boost converter that accomplishes one-at-a-time switch control by simultaneously employing an analog error signal to control one drive output and an analog inversion of that error signal, with respect to a voltage that is equal to the voltage excursion limit of a timing ramp signal, to control the other drive output.

It is another object of the present invention to provide an alternative controller for a two-switch buck-boost converter that accomplishes one-at-a-time switch control by employing a comparator to compare an analog error signal against a given voltage excursion limit of a timing ramp signal to perform the functions of determining which of two drive outputs is to be enabled to be modulated and of modifying the voltage excursion limits of the timing ramp signal such that the voltage excursion limit compared by the comparator is switched between two different voltage excursion limits.

DETAILED DESCRIPTION OF THE PREFERRED EMBODIMENTS

Figure 1:
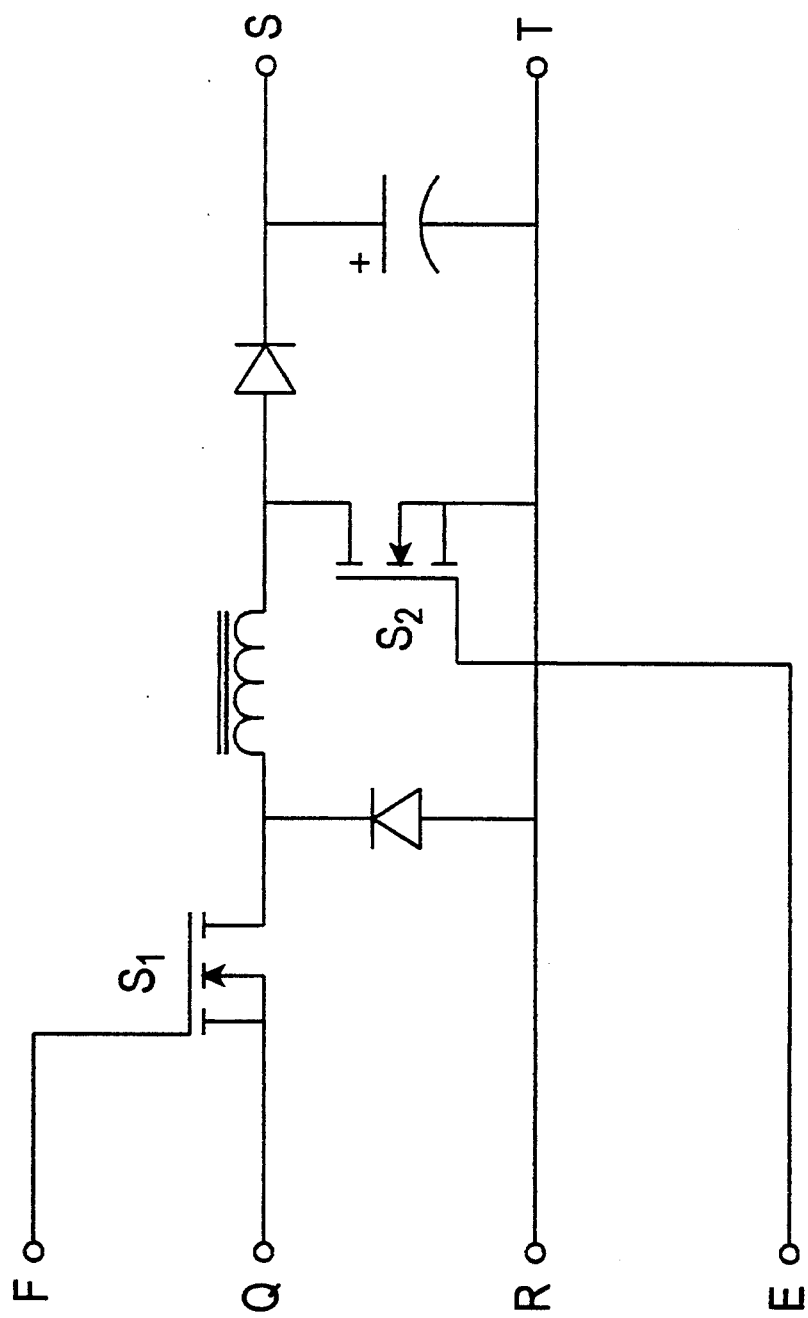
FIG. 1 is a schematic diagram of a prior art two-switch buck-boost converter.
Figure 3A:
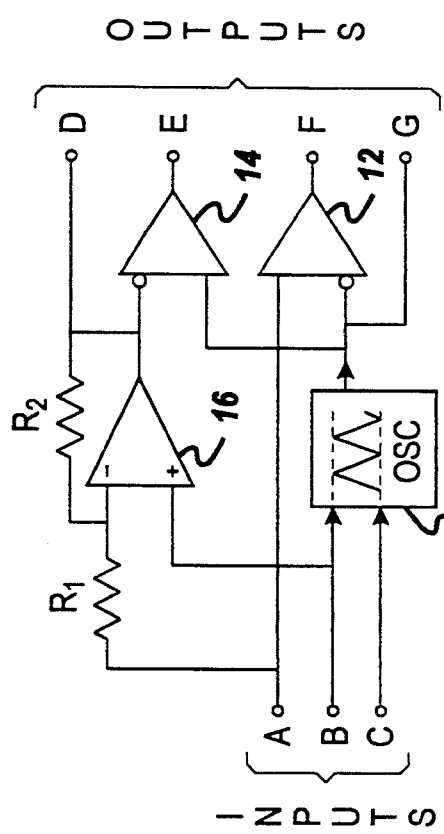
FIG. 3A is a functional block diagram of a buck-boost controller in accordance with a first embodiment of the present invention.
Figure 3B:
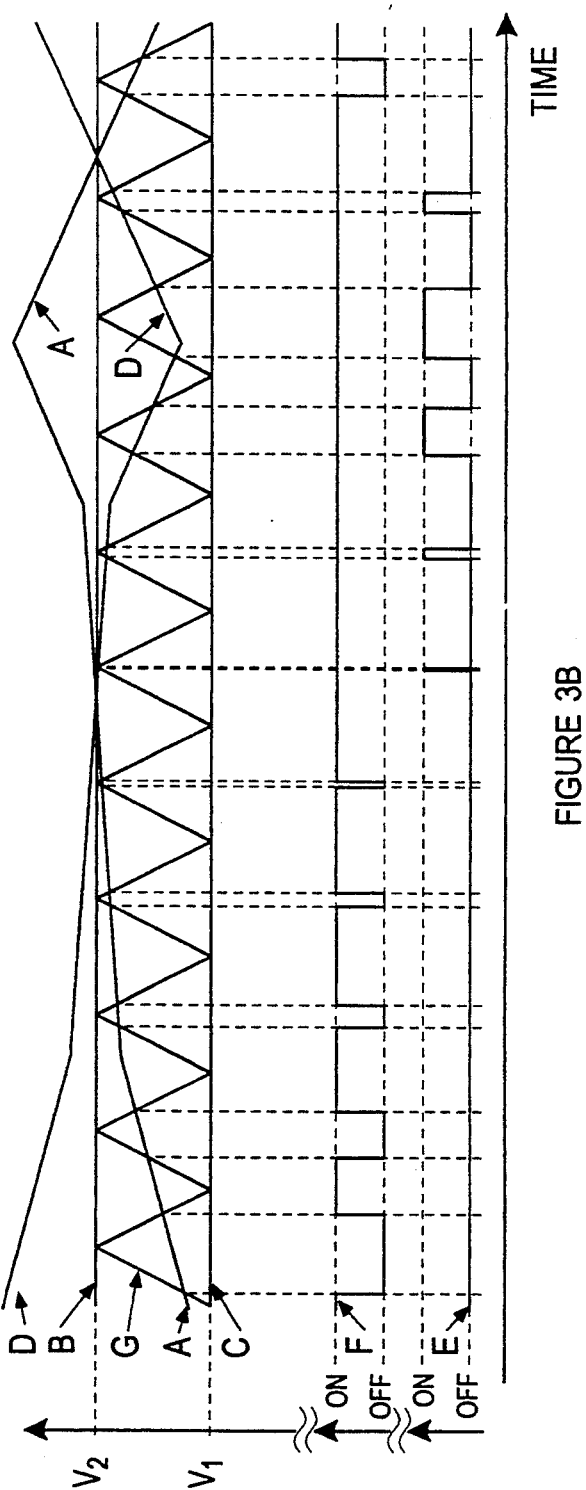
FIG. 3B is a waveform diagram illustrating various voltage waveforms associated with operation of the buck-boost controller of FIG. 3A.

Referring now to FIGS. 3A-B, there are shown a buck-boost controller and associated voltage waveform diagrams in accordance with a first embodiment of the present invention in which a triangle-wave oscillator 10 produces a voltage ramp signal (terminal G) at a constant frequency between two voltages that are applied at input terminals B and C. The voltage ramp signal produced by oscillator 10 may also be referred to as a timing ramp signal. An error signal is applied at terminal A. A first comparator 12 having an output terminal F compares the voltage ramp signal produced by oscillator 10 against the error signal. The input polarities of comparator 12 are configured such that when the error signal voltage exceeds the voltage ramp signal the output is high, and conversely. An output terminal F of comparator 12 serves as the control terminal for the buck switch S1 of a conventional buck-boost converter, such as that shown in FIG. 1. A second comparator 14 having an output terminal E compares the voltage ramp signal produced by oscillator 10 against the output of an operational amplifier 16. Operational amplifier 16 is configured for negative unity gain of the error signal applied at terminal A. A positive input of operational amplifier 16 is controlled by the same reference which controls the peak potential voltage (voltage applied at terminal B) of the voltage ramp signal produced by oscillator 10.

Figure 2A:
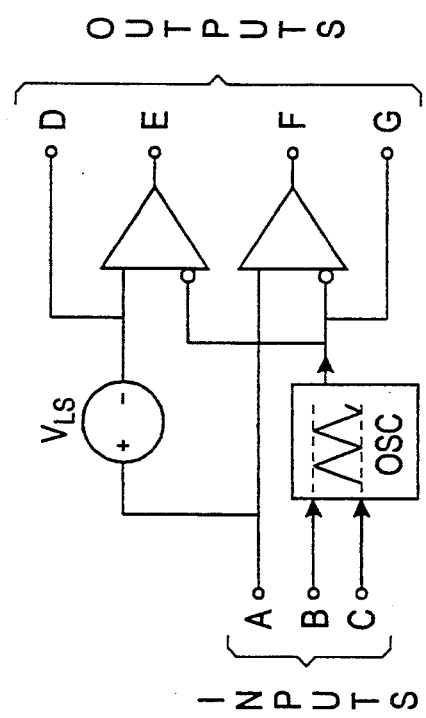
FIG. 2A is a functional block diagram of the prior art FA7618 buck-boost controller that may be employed to control the prior art two-switch buck-boost converter of FIG. 1.
Figure 2B:
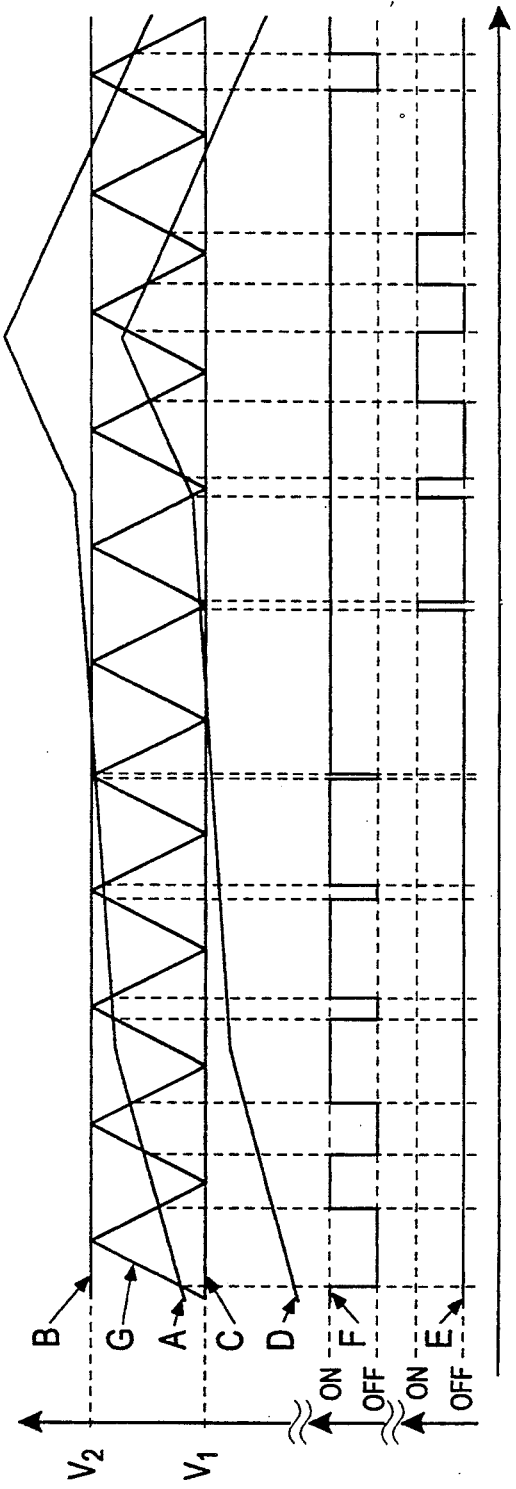
FIG. 2B is a waveform diagram illustrating various voltage waveforms that associated with operation of the prior art buck-boost controller of FIG. 2A.

While one-at-a-time buck-boost drive signals are provided by both the prior art circuit of FIG. 2A and the circuit of applicant's invention described in the preceding paragraph, a significant difference lies in the relationship between the boost drive signal and the voltage ramp signal. While the timing relationship of both buck and boost drive signals with respect to the voltage ramp signal are the same in both circuits in that both the buck and boost drive signals begin at 0% duty cycle at the valley of the voltage ramp signal, the buck drive signal in applicant's circuit begins at 0% duty cycle at the valley of the voltage ramp signal G, but the boost drive signal begins begins at 0% duty cycle at the peak of the voltage ramp signal G. The advantages of applicant's buck-boost controller circuit described above are the elimination of level shift circuitry and the ramp magnitude tracking requirement.

Figure 4A:
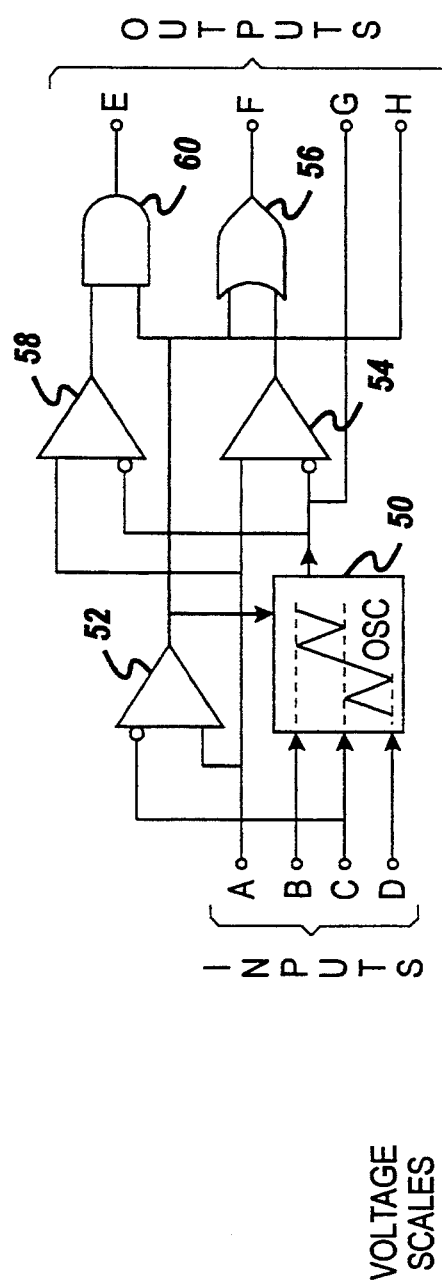
FIG. 4A is a functional block diagram of a buck-boost controller in accordance with a second embodiment of the present invention.
Figure 4B:
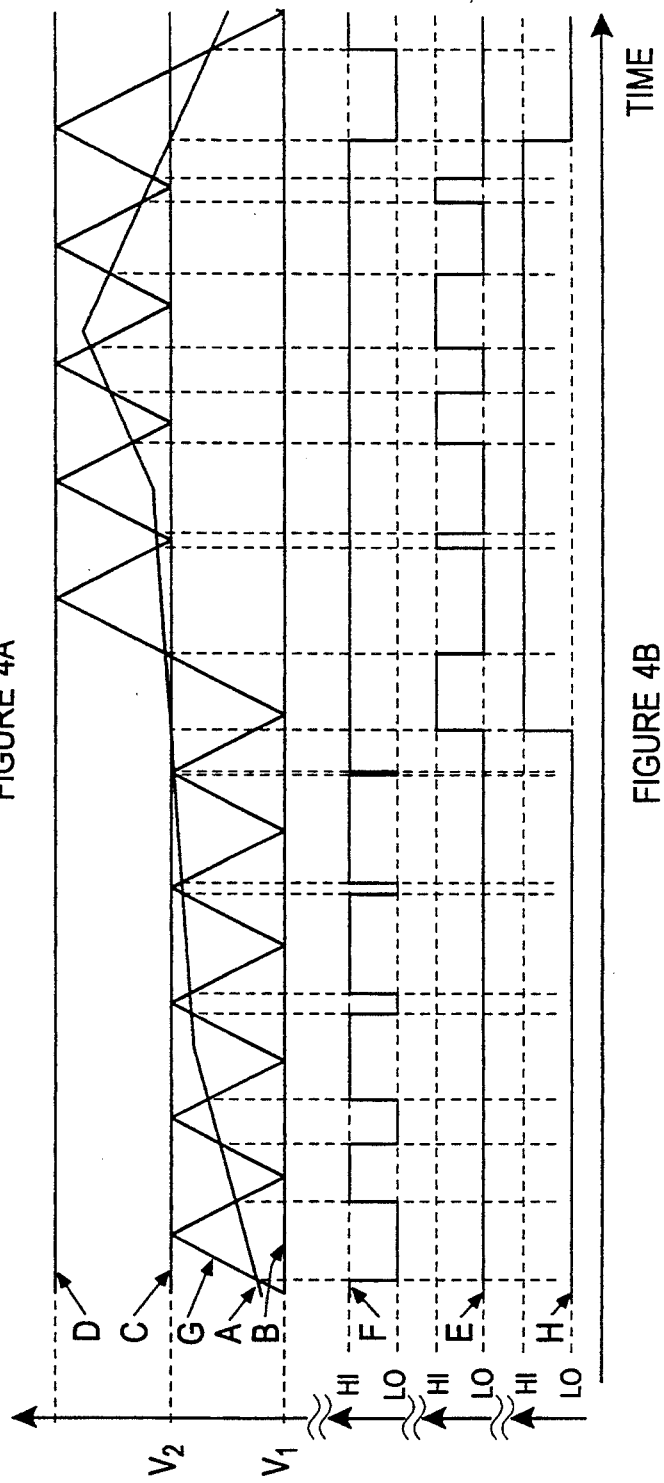
FIG. 4B is a waveform diagram illustrating various voltage waveforms associated with operation of the buck-boost controller of FIG. 4A.

Referring now to FIGS. 4A-B, there are shown a single-channel buck-boost controller and associated voltage waveform diagrams in accordance with a second embodiment of the present invention in which a triangle-wave oscillator 50 produces a voltage ramp signal (terminal G) between three voltages that are applied at input terminals B, C, and D. An error signal is applied at terminal A. A first comparator 52 having an output terminal H compares the error signal against the voltage applied at terminal C. If the voltage of the error signal is less than the voltage applied at terminal C, the output of comparator 52 will be low, and vice versa. The output of comparator 52 serves as an input to oscillator 50 such that when the input is low, oscillator 50 will produce a voltage ramp signal at terminal G that ramps between the voltages applied at terminals D and C. When the input to oscillator 50 is high, oscillator 50 will produce a voltage ramp signal that ramps between the voltages applied at terminals C and B. The voltages D, C, and B are in order of increasing voltage and are equally spaced in voltage. A second comparator 54 having an output terminal that serves as an input to an OR-gate 56 having an output terminal F compares the voltage ramp signal produced by oscillator 50 against the error signal. The input polarities of comparator 54 are configured such that when the voltage of the error signal exceeds the voltage of the voltage ramp signal produced by oscillator 50, the output of comparator 54 is high, and conversely. Terminal F serves as the control terminal for the buck switch S1 of a conventional buck-boost converter, such as that shown in FIG. 1. The output of comparator 52 is applied as a second input to OR-gate 56. This signal serves to maintain the buck switch S1 ON continuously when the voltage of the error signal exceeds the voltage applied at terminal C. A third comparator 58 having an output terminal that serves as an input to an AND-gate 60 having an output terminal E compares the voltage ramp signal produced by oscillator 50 against the error signal. The input polarities of comparator 58 are configured such that when the voltage of the error signal exceeds the voltage of the voltage ramp signal produced by oscillator 50, the output of comparator 58 is high, and conversely. Terminal E serves as the control terminal for the boost switch S2 of a conventional buck-boost converter, such as that shown in FIG. 1. The output of comparator 52 is applied as a second input to AND-gate 60 and serves to maintain the boost switch S2 OFF continuously when the voltage applied at terminal C exceeds the voltage of the error signal. Like the circuit described as being applicant's first embodiment of his invention, the second embodiment of his buck-boost controller also eliminates the complex level shifting circuitry employed in prior art buck-boost controllers.

I claim:

1. A controller for use with a two-switch buck-boost converter, the controller comprising:

oscillator means for receiving upper and lower input voltages and for generating a timing ramp signal having excursion voltage limits equal to said upper and lower input voltages;

amplifier means having an inverting input for receiving an error signal and a non-inverting input for receiving a selected one of said upper and lower input voltages, said amplifier means being operative for generating an inverted error signal in response to said error signal and said selected one of said upper and lower input voltages;

first comparator means for comparing said error signal to said timing ramp signal, for generating a first pulse-width-modulated signal as a result of comparing said error signal to said timing ramp signal, and for coupling said first pulse-width-modulated signal to a first switch of said two-switch buck-boost converter; and second comparator means for comparing said inverted error signal to said timing ramp signal, for generating a second pulse-width-modulated signal, and for coupling said second pulse-width-modulated signal to a second switch of said two-switch buck-boost converter.

2. A controller for use with a two-switch buck-boost converter, the controller comprising:

oscillator means for receiving upper, intermediate, and lower input voltages and for generating a timing ramp signal having excursion voltage limits selectable between said intermediate and lower input voltages and said intermediate and upper input voltages;

first comparator means for comparing an error signal to said timing ramp signal and for generating a pulse-width-modulated signal;

second comparator means for comparing said error signal to said intermediate input voltage and for generating a two-state select signal;

means responsive to said select signal for selecting one set of said excursion voltage limits of said timing ramp signal when said select signal is in a first state and for selecting the other set of said excursion voltage limits of said timing ramp signal when said select signal is in a second state; and logic means for gating said pulse-width-modulated signal and said select signal for applying said pulse-width-modulated signal to a first switch of said two-switch buck-boost converter when said select signal is in said first state and for maintaining said first switch in an ON state when said select signal is in said second state, said logic means being further operative for applying said pulse-width-modulated signal to a second switch of said two-switch buck-boost converter when said select signal is in said second state and for maintaining said second switch in an OFF state when said select signal is in said first state.

3. A controller as in claim 1, further comprising latch means for enabling only one of said first and second switches to be modulated during a full cycle of said timing ramp signal.

4. A controller as in claim 2, further comprising latch means for latching said select signal to prevent a change of state of said select signal except when said timing ramp signal is substantially equal to any of said excursion voltage limits.

5. A controller as in claim 1 wherein:

said timing ramp signal comprises a substantially triangular waveform;

said amplifier means is configured to perform an inversion of substantially unity gain of said inverting input with respect to said non-inverting input;

said error signal comprises an amplified and filtered signal having inverse polarity with respect to an output voltage of said two-switch buck-boost converter;

said non-inverting input of said amplifier receives said upper input voltage;

said first switch comprises a buck switch of said two-switch buck-boost converter;

said second switch comprises a boost switch of said two-switch buck-boost converter;

said first comparator means has a polarity configuration selected to cause said first pulse-width-modulated signal to turn ON said buck switch when a voltage of said error signal is greater than a voltage of said timing ramp signal and to turn OFF said buck switch when the voltage of said error signal is less than the voltage of said timing ramp signal; and said second comparator means has a polarity configuration selected to cause said first pulse-width-modulated signal to turn ON said boost switch when a voltage of said inverted error signal is less than the voltage of said timing ramp signal and to turn OFF said boost switch when the voltage of said error signal is greater than the voltage of said timing ramp signal, 6. A controller as in claim 2 wherein:

said timing ramp signal comprises a voltage waveform having a substantially fixed rate of excursion between said selectable voltage limits;

said error signal comprises an amplified and filtered signal having inverse polarity with respect to an output voltage of said two-switch buck-boost converter;

said first state of said select signal results from a comparison by said second comparator when a voltage of said error signal is less than said intermediate input voltage and said second state of said select signal results from a comparison by said second comparator when the voltage of said error signal is greater than said intermediate input voltage;

said means responsive to said select signal selects said intermediate and lower excursion voltage limits when said select signal is in said first state and selects said intermediate and upper excursion voltage limits when said select signal is in said second state;

said logic means is configured to apply said pulse-width-modulated signal to a buck switch of said two-switch buck-boost converter when said select signal is in said first state and to maintain a boost switch of said two-switch buck-boost converter in an OFF state when said select signal is in said first state; and said logic means is further configured to apply said pulse-width-modulated signal to said boost switch when said select signal is in said second state and to maintain said buck switch in an ON state when said select signal is said second state.

7. A process for controlling buck and boost switches of a two-switch buck-boost converter, the process comprising the steps of:

receiving upper and lower input voltages;

generating a timing ramp signal having upper and lower excursion voltage limits equal to said upper and lower input voltages, respectively;

generating a first pulse-width-modulated signal by comparing an error signal with a selected one of said upper and lower input voltages;

coupling said first pulse-width-modulated signal to a first switch of said two-switch buck-boost converter;

forming an inverted error signal as a function of said error signal and said selected one of said upper and lower input voltages;

generating a second pulse-width-modulated signal by comparing said inverted error signal to said timing ramp signal; and coupling said second pulse-width-modulated signal to a second switch of said two-switch buck-boost converter.

8. A process for controlling buck and boost switches of a two-switch buck-boost converter, the process comprising the steps of:

receiving upper, intermediate, and lower input voltages;

generating a timing ramp signal having excursion voltage limits selectable between the combination of said-intermediate and lower input voltages and the combination of said intermediate and upper input voltages;

generating a pulse-width-modulated signal by comparing an error signal to said timing ramp signal;

generating a two-state select signal by comparing said error signal to said intermediate input voltage;

selecting one combination of said excursion voltage limits of said timing ramp signal when said select signal is in a first state;

selecting the other combination of said excursion voltage limits of said timing ramp signal when said select signal is in a second state; and applying said pulse-width-modulated signal to a first switch of said two-switch buck-boost converter when said select signal is in said first state;

maintaining said first switch in an ON state when said select signal is in said second state;

applying said pulse-width-modulated signal to a second switch of said two-switch buck-boost converter when said select signal is in said second state; and maintaining said second switch in an OFF state when said select signal is in said first state,

* * * * *